Figure 1:
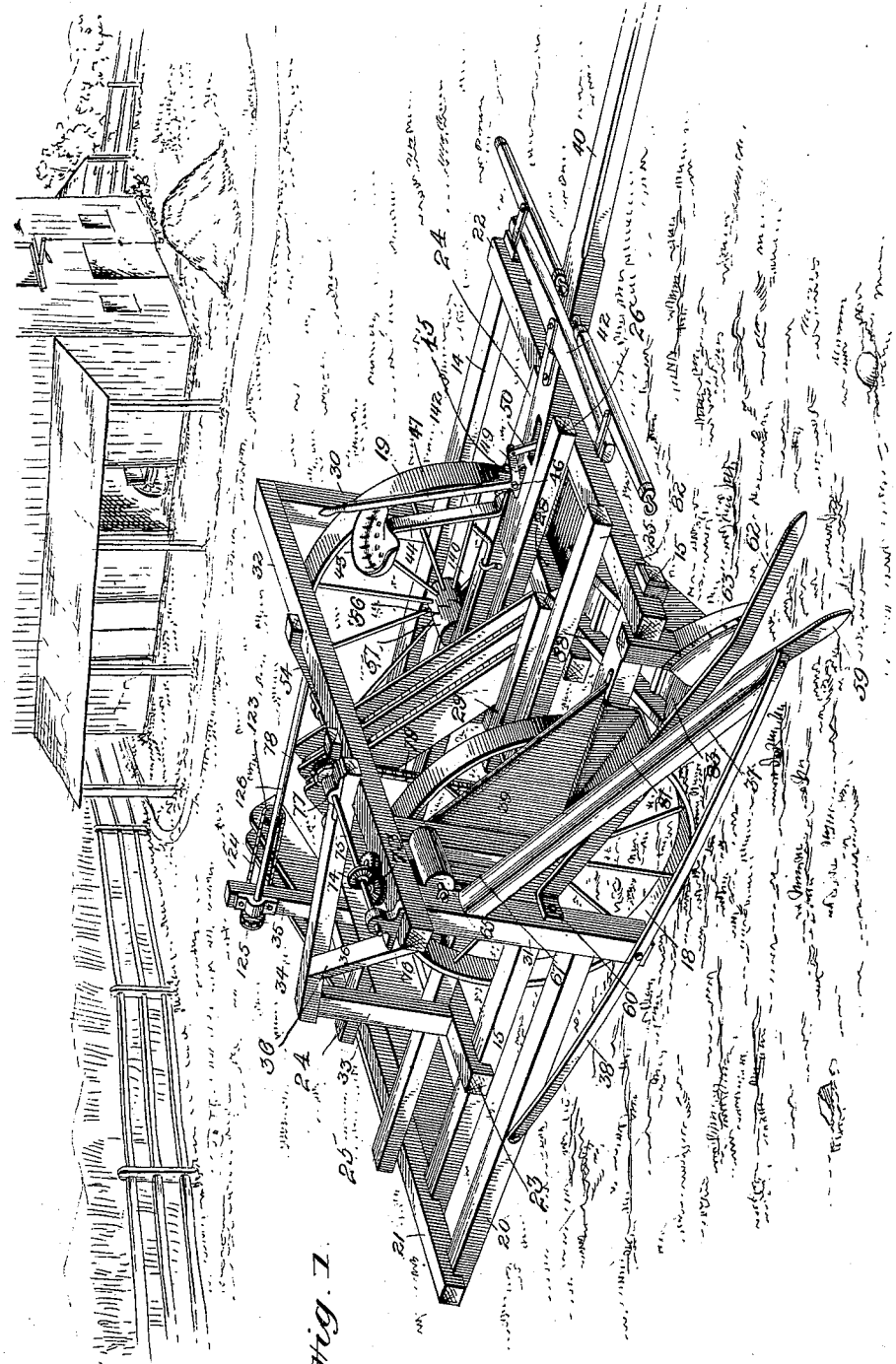

No. 611,791. Patented Oct. 4, 1898.
D. McMANNAMA.
CORN HARVESTING AND HUSKING MACHINE.
(Application filed Nov. 13, 1897.)

(No Model.) 4 Sheets—Sheet 1.

Witnesses
Inventor
Doc McMannama,
by O'Meara
Attorneys

No. 611,791. Patented Oct. 4, 1898.
D. McMANNAMA.
CORN HARVESTING AND HUSKING MACHINE.
(Application filed Nov. 13, 1897.)
(No Model.) 4 Sheets—Sheet 2.
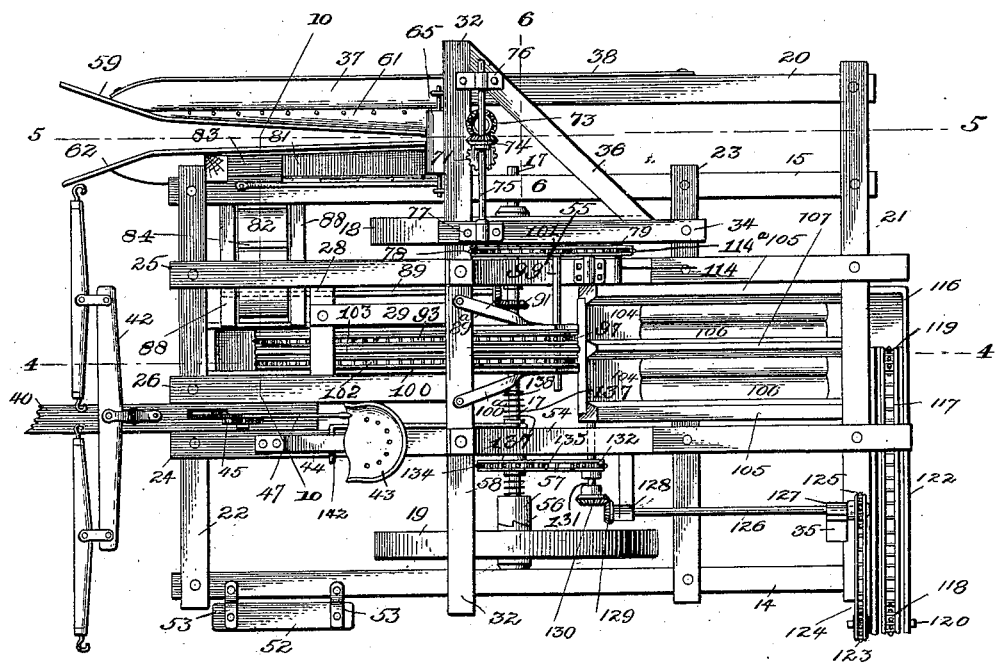
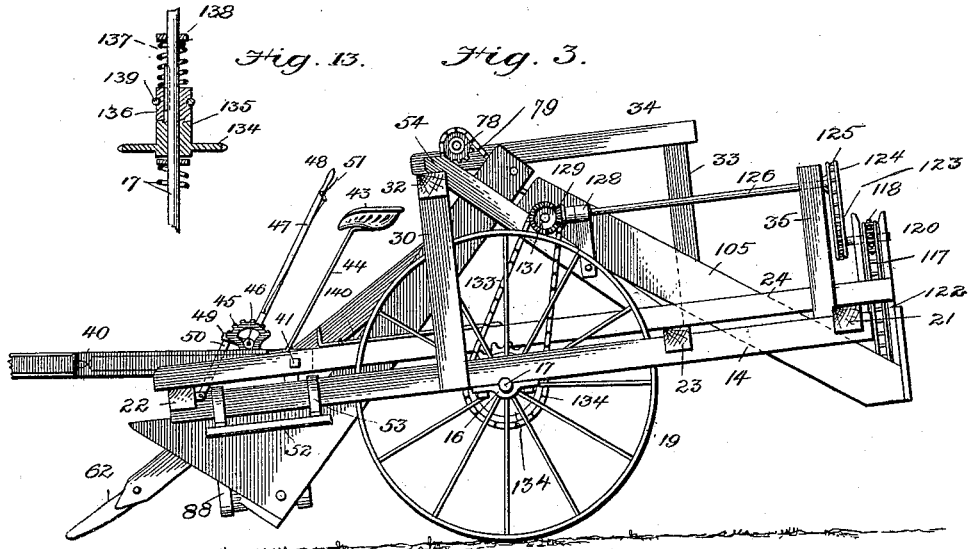
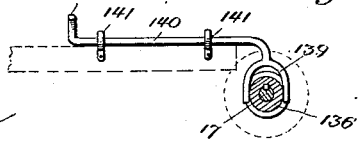
Witnesses
Inventor
Doc McMannama, No. 611,791. Patented Oct. 4, 1898.
D. McMANNAMA.
CORN HARVESTING AND HUSKING MACHINE.
(Application filed Nov. 13, 1897.)
(No Model.) 4 Sheets—Sheet 3.

Witnesses
J. J. Cross
Chas E Brock

Inventor
Doc McMannama,
by
Attorneys

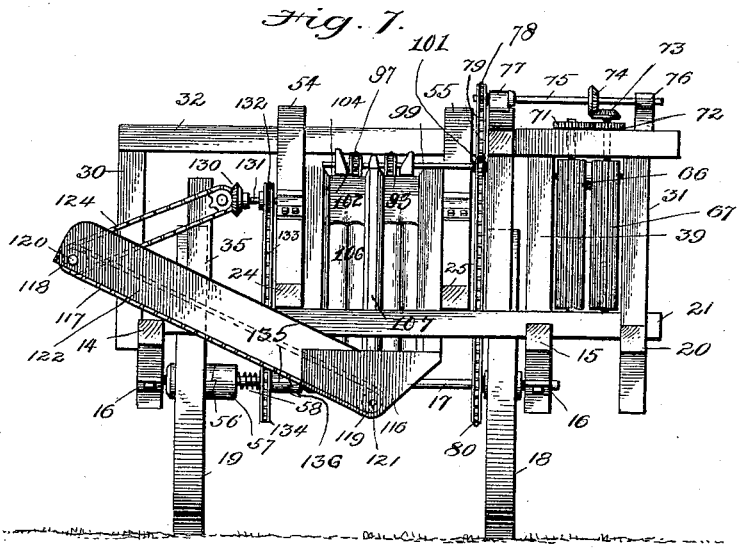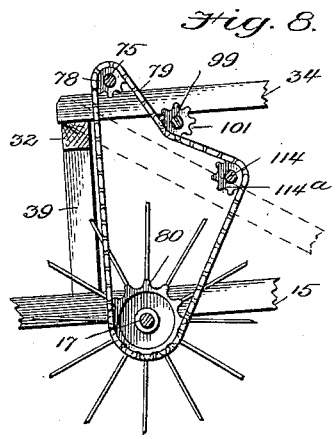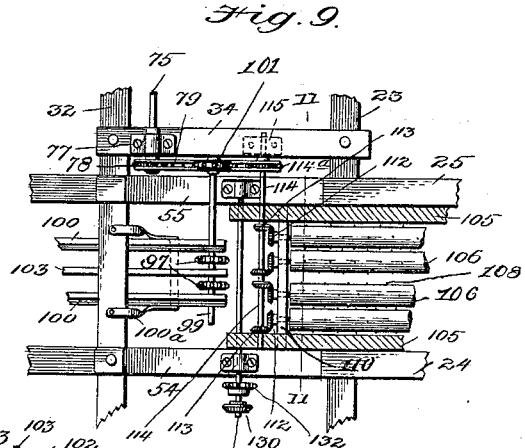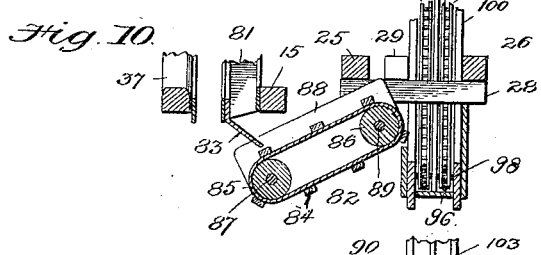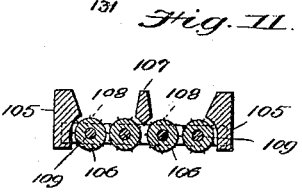

UNITED STATES PATENT OFFICE.

DOC McMANNAMA, OF VILLISCA, IOWA.

CORN HARVESTING AND HUSKING MACHINE.

SPECIFICATION forming part of Letters Patent No. 611,791, dated October 4, 1898.

Application filed November 13, 1897. Serial No. 658,470. (No model.)

*To all whom it may concern:*

Be it known that I, DOC McMANNAMA, a citizen of the United States, residing at Villisca, in the county of Montgomery and State of Iowa, have invented a new and useful Corn Harvesting and Husking Machine, of which the following is a specification.

My invention relates to machines for harvesting and husking corn in the field, and has for its object to generally improve the construction and operation of such machines.

A further object of my invention is to provide a machine of this class with improved mechanism whereby the corn is stripped from the stalks, the stalks dropped upon the ground, the husks stripped from the ears, and the ears elevated and dropped into a wagon driven alongside of the machine while in operation.

With these objects in view my invention consists in a corn harvesting and husking machine comprising a framework provided with supporting and driving wheels, a tongue and attachments for harnessing horses to the machine, fenders projecting forward outside of the line of draft in position to straddle a row of corn and guide the stalks inward to suitable stripping-rolls, which strip the ears off the stalks, a forwardly-projecting inclined chute alongside of the inner fender, through which the ears are passed longitudinally, a transverse elevating-carrier at the foot of the chute to receive the ears and carry them laterally and upwardly without changing their position with relation to the length of the machine, upwardly and rearwardly inclined elevators to receive the ears from the transverse elevator, also without changing their relative positions, duplicate pairs of longitudinally-arranged husking-rollers upon which the ears are delivered longitudinally by the longitudinal elevator and by which the husks are stripped off the ears and drawn through the rollers and dropped upon the ground, and a transverse upwardly-inclined elevator at the rear of the machine for receiving the ears free from husks and elevating and dropping them into a wagon driven alongside of the machine while in operation.

My invention further consists in the improved construction, arrangement, and combination of details hereinafter fully described and afterward specifically pointed out in the appended claims.

In order to enable others skilled in the art to which my invention most nearly appertains to make and use same, I will now proceed to describe its construction and operation, reference being had to the accompanying drawings, forming part of this specification, in which—

Figure 4:
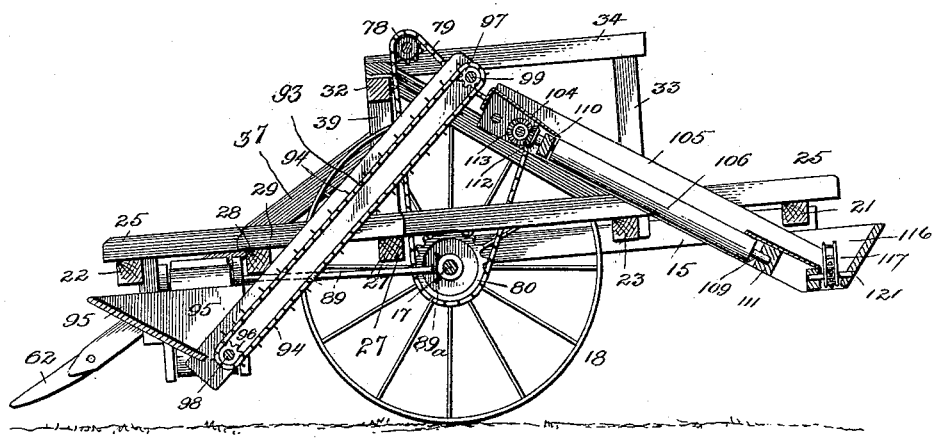
Figure 5:
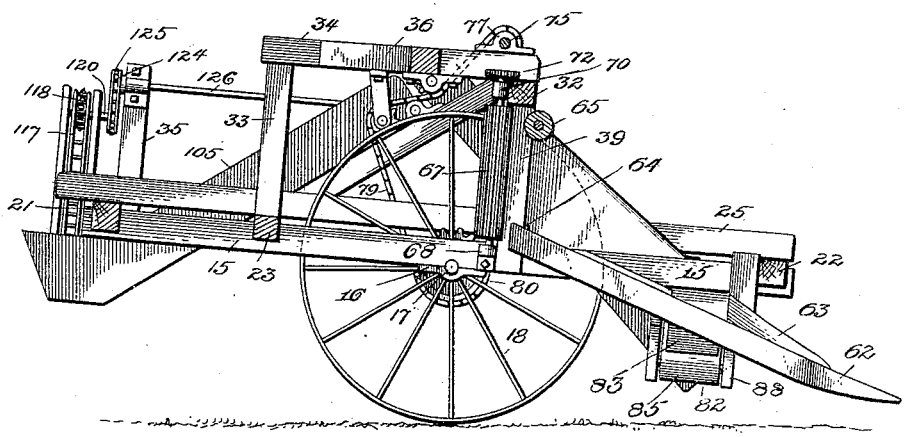
Figure 6:
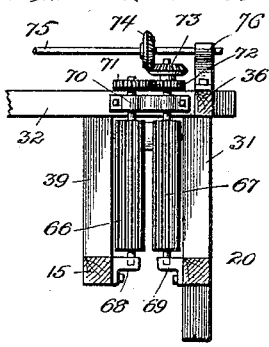

Figure 1 is a perspective view of a harvesting and husking machine constructed in accordance with my invention in position for practical operation. Fig. 2 is a top plan view thereof. Fig. 3 is a view of the machine in side elevation. Fig. 4 is a vertical longitudinal sectional view taken on the plane indicated by the line 4 4 of Fig. 2, looking in the direction of the arrow. Fig. 5 is a similar sectional view on the plane indicated by the line 5 5 of Fig. 2, looking in the opposite direction, as indicated by the arrow. Fig. 6 is a detail sectional view on the line 6 6 of Fig. 2. Fig. 7 is a view of the complete machine in rear elevation. Fig. 8 is a detail view of the driving mechanism for the stripping-rolls, longitudinal elevator, and husking-rolls. Fig. 9 is a detail plan view illustrating parts of the frame, the stripping-rolls, and the duplicate elevators with their driving mechanism. Fig. 10 is a detail sectional view on the line 10 10 of Fig. 2. Fig. 11 is a transverse section through the husking-rolls. Fig. 12 is a detail plan view of the mechanism shown in Fig. 10, parts being omitted. Figs. 13 and 14 are details of the elevator-clutch devices.

Like numerals of reference mark the same parts wherever they occur in the various figures of the drawings.

Referring to the drawings by numerals, 14 and 15 are longitudinal beams of the frame of the machine, under which are secured bearings 16, in which the axle 17 is journaled, wheels 18 and 19, upon which the machine is supported, being mounted on said axle to rotate thereon. A short longitudinal beam 20 is provided outside of and parallel with the beam 15, the three beams 14, 15, and 20 being connected by a cross-beam 21 at the rear of the machine and the beams 14 and 15 being connected by a cross-beam 22 at the front of the frame and a cross-beam 23, located a short distance in front of the rear end of the machine. These three cross-beams rest upon and are notched over the longitudinal beams. Two longitudinal beams 24 and 25 rest upon the cross-beams 21, 22, and 23 and extend the whole length of the machine. A short longitudinal beam 26 rests at its front end on the front cross-beam 22 and at its rear end on a short cross-beam 27, Fig. 4, which rests upon the longitudinal beams 24 and 25.

A short cross-beam 28 is secured at its ends to the under sides of the longitudinal beams 25 and 26, while a short longitudinal beam 29 rests at one end on the beam 28 and at the other end on the beam 27. Uprights 30 and 31 are secured to the longitudinal beams 14 and 20, a cross-beam 32 being supported on top of said uprights. Another upright 33 is mounted upon the cross-beam 23 and a short longitudinal beam 34 is supported upon the top of this upright and of the cross-beam 32. An upright 35 is secured to the inner side of the rear cross-beam 21. A diagonal horizontal brace 36 extends from the cross-beam 32 to the longitudinal beam 34. A downwardly and forwardly inclined bar 37 is secured in front of the upright 31, and a metal brace-bar 38 is secured to the outside of the bar 37, the upright 31, and the longitudinal beam 20.

An upright 39 is mounted upon the longitudinal beam 15 and extends from it to the cross-beam 32. A tongue 40 is pivoted on a horizontal bolt 41 between the short longitudinal beam 26 and the forward portion of the beam 24. Suitable doubletrees 42 or any equivalent mechanism for the attachment of horses to the machine may be provided.

All the working parts of the machine are mounted upon the framework heretofore described, which is supported upon the single axle 17. Without some means for controlling and supporting the frame in its proper position either the front or the rear end would drop to the ground. For this reason the tongue 40 is pivoted as aforesaid, and the angle with relation to the earth at which the main frame is to be adjusted is determined by the following arrangement:

43 is the seat for the driver, mounted upon a bar 44, secured upon the upper surface of the beam 24 alongside of the tongue 40. Upon the tongue is mounted a curved segment-rack 45, at the center of which, at 46, a hand-lever 47 is pivoted, the handle 48 of which is located in the proper position to be grasped by the right hand of the driver occupying the seat 43. An arm 49 projects at substantially a right angle from the handle-lever and is connected by a link 50 with the cross-beam 22. By operating the handle-lever 47 forward and backward the front portion of the frame may be lowered or raised at will and held in any desired adjustment by means of pawl mechanism 51, attached to the handle-lever 47 and engaging the teeth of the curved segment-rack 45. A step 52 is attached to the beam 14 by depending brackets 53 to assist the driver in mounting.

The frame, especially that portion supported on the uprights 30 and 31, is stiffened and braced by diagonal brace-beams 54 and 55, the former secured at its opposite ends on the upper cross-beam 32 and the longitudinal beam 24 and the latter upon the upper cross-beam 32 and the longitudinal beam 25, said braces extending downwardly and rearwardly.

All the moving mechanism of my machine is operated by the rotation of the axle, caused by drawing the machine over the ground by horses or otherwise, and in order that the mechanism cannot be operated when backing the machine and may be thrown out of operation at any time desired while the machine is moving forward I have formed on the inside of the hub of the wheel 19 (which, as before stated, is loosely mounted on the axle) a series of clutch-teeth 56, and just inside of the hub I have mounted on the axle by means of spline and feather or otherwise, to permit of its sliding and prevent its independent rotation, a sleeve 57, having corresponding clutch-teeth and held normally in engagement with the teeth 56 of the hub by means of a spring 58.

When the machine is driven forward, the wheel 19 will rotate from contact with the ground and by means of the engagement of the teeth of its hub with those of the sleeve 57 will cause the axle 17 to rotate, and thus drive all the mechanism of the machine, and if the horses should back the peculiar shape of the teeth of the hub and the sleeve would cause the hub-teeth to slide over the sleeve-teeth without rotating the axle.

Suitable mechanism may be provided extending within easy reach of the driver by means of which the sleeve may be moved laterally away from the hub whenever it is desired to stop the operation of the mechanism while the machine is being moved forward.

Secured at its outer end upon the bar 37 is a flat fender-bar 59, the forward end of which is pointed and the rear end of which is bent at right angles at 60 and secured to the front face of the upright 31.

A piece of sheet metal 61 is secured to this metallic strip or bar on one side and to the bar 37 on the other, whereby the space between the two bars is filled and the metallic bar braced. Opposite the metallic bar 59 is a similar metallic bar 62, which is secured at its forward end upon a bracket 63, depending from the main frame of the machine, the rear end of this metallic bar being secured at 64 to the upright 39. The bars 59 and 62 are inclined outwardly from each other and downwardly at their front ends, so that the stalk of corn will be guided between them as the machine moves forward until the upper portion of the stalk containing the ears strikes a horizontal roller 65, journaled in bearings in the uprights 31 and 39, which will bend the upper part of the stalk forward and cause the lower portion to pass between vertical corrugated rollers 66 and 67, mounted on shafts which are journaled at their lower ends in brackets 68 and 69, secured to the longitudinal beams 15 and 20, and near their upper ends in the bearing 70, mounted upon the rear face of the upper cross-beam 32. These shafts extend above the bearing-block 70 and carry gear-wheels 71 and 72, which intermesh, to provide for the simultaneous rotation of the rollers in the proper relative direction.

Upon the upper end of one of the shafts is mounted a bevel-gear 73, which meshes with a bevel-gear 74 on a shaft 75, journaled at one end in a bearing 76, mounted partially on a cross-beam 32 and partially on the brace-beam 36 and near its opposite end in a bearing 77, mounted on top of the beam 34. This shaft 75 projects beyond the bearing 77 and carries a sprocket-wheel 78 and derives its rotation from the axle through the medium of a sprocket-chain 79 and a sprocket-wheel 80 on the axle 17.

As the cornstalk passes through between the rollers 66 and 67 the ears of corn, which are of greater diameter than the space between the rollers, will be pinched off the stalks and dropped into a trough 81 alongside of the fender 62, said trough extending frontwardly and downwardly and delivering the unhusked ears of corn upon the top of a laterally-moving elevator 82, the ears being guided in their downward movement by a laterally-arranged deflector 83. The cornstalks in the meantime have passed entirely through between the corrugated rollers 66 and 67 and are either left standing or dropped upon the ground.

The elevator 82 is provided with cross-bars 84 and is mounted at each end upon a roller, as 85 and 86, the roller 85 being mounted upon a shaft 87, journaled in the side frames 88, and the roller 86 on a shaft 89, also journaled in said side frames.

The shaft 89 is extended laterally beyond the side frames and at its outer end is provided with a beveled gear 89ª, which engages a bevel-gear 91, (shown in Fig. 2,) mounted on the axle 17. A sprocket-chain 93 is provided with projecting teeth 94 and forms an elevator leading from a deflecting-trough 95 (into which the unhusked ears are dropped by the elevator 82) upward and rearward to a shaft 99 about vertically over the axle of the machine, said sprocket-chain being mounted on sprocket-wheels 96 and 97, mounted on shafts 98 and 99, journaled in the side frames or bearings 100, secured to the frame of the machine and supported by a bracket-bar 100ª, passing under said side frames and secured upon the top of the upper cross-bar 32.

The shaft 99 projects laterally and is provided on its outer end with a sprocket-wheel 101, which engages with the drive-chain 79, whereby the shaft 99 and the elevator sprocket-chain 93 are driven. A duplicate elevator, consisting of a sprocket-chain 102, is mounted upon the same shaft as the elevator 93 within the side frames 100, the two elevators being parallel and separated by a partition 103.

The unhusked ears, as before stated, are dropped in the deflecting-trough 95 and taken up by the duplicate elevators, carried to their upper ends and dropped off upon a guide-plate 104, mounted between side frames 105, secured to the frame of the machine, which side frames, as well as the guide-plate, are inclined rearwardly and downwardly, and the unhusked ears slide over the guide-plate upon the husking-rollers 106, which are mounted in pairs parallel with each other and separated by a partition 107. It will be obvious that the rollers are also inclined downwardly and backwardly, as are the side frames 105, guide-plate 104, and partition 107. These rollers are provided with teeth 108 and are mounted on shafts 109, which are journaled in bars 110 111, mounted between the side frames 105, said shafts being extended rearwardly and each provided with the bevel-gear 112, which meshes with a similar bevel-gear 113, mounted on a transverse shaft 114, journaled in a bearing 115, depending from the beam 34, said shaft also passing through the side frames 105.

The shaft 114 carries a sprocket-wheel 114ª, which is also driven by the drive-chain 79. The pairs of rollers are thus made to rotate in a direction to carry their meeting sides downward, so that the teeth will grip the husks of the unhusked ears passing over them and draw them through between the rollers. The ear of corn inside of the husk being of greater diameter than the space between the rollers will be left on top and the husks stripped off of them. The husked ears will be delivered into a deflecting-trough 116 at the rear of the machine, from which they will be taken by an elevator 117, which will carry them upward and laterally beyond the edge of the machine and drop them into the wagon, (not shown,) which will be driven alongside of the machine.

The elevator 117 is operated by means of sprocket-wheels 118 and 119, mounted upon shafts 120 and 121, journaled in side frames 122, the shaft 120 being extended laterally and provided with a sprocket-wheel 123, which is connected by the drive-chain 124 with the sprocket-wheel 125, mounted on a shaft 126, journaled in bearings 127 and 128 and carrying at its front end a bevel-gear 129, which meshes with a similar bevel-gear 130 on a transverse shaft 131, carrying a sprocket-wheel 132, connected by a sprocket-chain 133 with a sprocket-wheel 134, loosely mounted on the axle 17.

The hub 135 of sprocket-wheel 134 is provided on its end with clutch-teeth, which engage similar teeth on a sleeve 136, splined on the axle 17 and normally held against the hub of the sprocket-wheel by a spring 137, coiled around the axle between the sleeve and a fixed collar 138. The sleeve is provided with a circumferential groove, in which a yoke engages, said yoke being upon the end of a horizontal rod 140, pivoted in eyes or staples 141, secured in the beam 24 of the frame of the machine, said rod being bent at its end 142, so that it may be turned by pressure of the foot of the driver to disengage the sleeve 136 from the hub 135 of sprocket-wheel 134 to permit the axle to turn without turning the sprocket-wheel, thus uncoupling the elevator when desired.

The construction and operation of my improved corn harvesting and husking machine will be readily understood from the foregoing description, and it will be obvious to any one skilled in the art that the mechanism I have provided will perform the various operations which are the objects of my invention.

The machine can be driven, with the wagon alongside of it, continuously around a cornfield until all of the ears have been stripped from the stalks, the stalks left in the field either standing or down, the ears husked, the husks dropped upon the ground, and the husked corn delivered into the wagon ready to be hauled into the barn.

By the use of my invention, the construction of which is simple and easily kept in repair, an amount of work may be done with a double team of horses and the machine and wagon much greater than could possibly be done with the same force by hand or by any other machine with which I am acquainted, and while I have illustrated and described the best means for carrying out my invention I do not wish to be understood as restricting myself to the exact details of construction shown, but hold that any slight changes such as might suggest themselves to the ordinary mechanic would properly fall within the limit and scope of my invention.

Having thus fully described my invention, what I claim as new, and desire to secure by Letters Patent of the United States, is—

1. In a corn harvesting and husking machine, the combination with the frame, axle and wheels, of means for stripping the stalk and ears apart, a downwardly and forwardly inclined trough or chute to carry the ears forward, a laterally-impelled elevator to receive them and carry them laterally and upward, upwardly and rearwardly inclined elevators to carry them upward and backward, substantially as described.

2. In a corn harvesting and husking machine, the combination with the frame, axle and wheels, of means for stripping the stalk and ears apart, a downwardly and forwardly inclined trough or chute to carry the ears forward, a laterally-impelled elevator to receive them and carry them laterally and upward, rearwardly and upwardly inclined elevators to carry them upward and backward, and backwardly and downwardly inclined stripping-rolls to strip the husks from the ears and drop them upon the ground, substantially as described.

3. In a corn harvesting and husking machine, the combination with the frame, axle and wheels, of means for stripping the stalks and ears apart, a downwardly and forwardly inclined trough or chute to carry the ears forward, a laterally-impelled elevator to receive them and carry them laterally and upward, backwardly and upwardly inclined elevators to carry them upward and backward, backwardly and downwardly inclined stripping-rolls to strip the husks from the ears and drop them upon the ground, and a laterally and upwardly inclined elevator to convey the husked ears to a wagon driven alongside of the machine, substantially as described.

DOC McMANNAMA.

Witnesses:
THOS. GOODWIN,
CHARLES STENNETT.